(No Model.)

J. L. HARRELL.
SEEDING MACHINE.

No. 461,476. Patented Oct. 20, 1891.

Witnesses:
Willis Norton
W. S. Brundage

Inventor:
James L. Harrell,
by W. W. Dudley
Attorney.

UNITED STATES PATENT OFFICE.

JAMES L. HARRELL, OF PALMYRA, NORTH CAROLINA.

SEEDING-MACHINE.

SPECIFICATION forming part of Letters Patent No. 461,476, dated October 20, 1891.

Application filed March 17, 1891. Serial No. 385,404. (No model.)

*To all whom it may concern:*

Be it known that I, JAMES L. HARRELL, a citizen of the United States, residing at Palmyra, in the county of Martin and State of North Carolina, have invented certain new and useful Improvements in Seeding-Machines; and I do hereby declare the following to be a full, clear, and exact description of the invention, such as will enable others skilled in the art to which it appertains to make and use the same.

My invention relates to seeding-machines; and it consists, generally, in providing a roller with a series of recesses or pockets, which are supplied with seed from a hopper located above said cylinder, and in certain other new and novel details of construction whereby the desired results are attained, all of which will be fully set forth in the following description and specifically pointed out in the claims.

Figure 1:
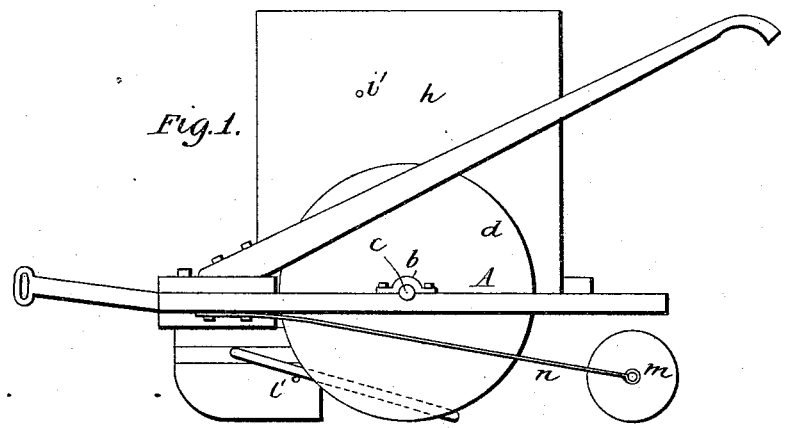
Figure 2:
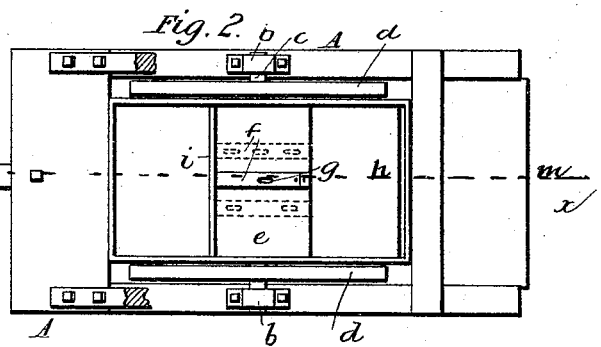
Figure 5:
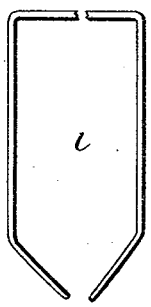
Figure 3:
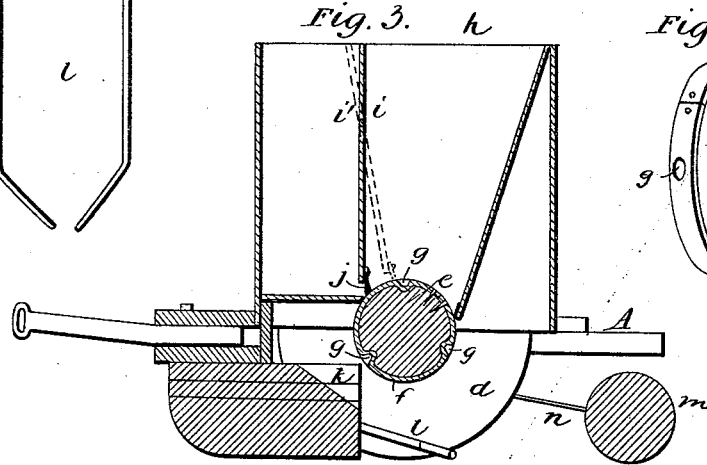
Figure 4:
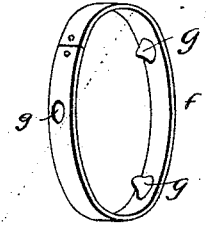

In the accompanying drawings, Figure 1 illustrates in side elevation my improved seeding-machine; Fig. 2, a plan view thereof; Fig. 3, a section through the line $x\ x$, Fig. 2; Figs. 4 and 5, details.

Referring to said drawings, A represents the frame of the machine, which is provided, centrally, with the journal-boxes $b\ b$, which support the ends of the shaft $c$. Mounted on this shaft are the drive-wheels $d\ d$ and the feed-roller $e$, which roller is provided with one or more metallic interchangeable bands $f\ f$, having recesses or pockets $g$ therein, arranged according to the desired quantity of seeds to be sown or to the distance between the deposits. Arranged above this roller and supported by the frame is a box $h$, which constitutes the hopper for containing the seed.

$i$ is a partition-board pivoted at $i'$, and which is provided at its lower end with a brush $j$ to prevent any loose seed clinging to the roller from being deposited. This board $i$ may be swung, as shown in full lines, Fig. 3, to form a receptacle for the seed, or it may be swung to the position shown in dotted lines in said figure to form two hoppers. The seeds enter the pockets in the roller, and are carried thereby to the guideway $k$, and from there to the ground.

$l\ l$ are arms which are pivoted forward of the roller, and the outer ends of which are supported by stops $l'$, allowing the ends of the arms to drag over the ground at the rear of the seed last deposited and partially cover them.

$m$ is the drag-roller which flattens the planted ground. The shaft of this roller is journaled in spring-arms $n$, which are secured to the forward part of the frame, and the pressure of this roller may be readily increased or diminished, according to the pressure given to the handles.

Thus it will be seen that by my invention I am enabled to manufacture at small cost an effective seeding-machine of simple construction and one in which the number of seeds to be planted and the distance between the deposits may be regulated.

I claim—

1. In a seeding-machine, the combination, with the main frame and with a feed-roller, as described, of a feed-box above said roller and having the pivoted partition-board and brush thereon, for the purposes set forth.

2. In a seeding-machine, the combination of the main frame, a feed-roller having a series of interchangeable bands thereon, a box above said roller having a pivoted partition-board therein, having a brush thereon, and a drag supported in the outer ends of spring-arms, all substantially as and for the purpose set forth.

In testimony whereof I affix my signature in presence of two witnesses.

JAMES L. HARRELL.

Witnesses:
WILL T. NORTON,
ARTHUR BROWNING.